April 16, 1968

S. THALER ETAL 3,377,861

ELECTRONIC LIQUID MEASURING SYSTEM

Filed May 6, 1965

INVENTORS
SHERWOOD THALER
ALFRED D. GRONNER

BY *Edwin E. Greigg*

INVENTORS
SHERWOOD THALER
ALFRED D. GRONNER

United States Patent Office 3,377,861
Patented Apr. 16, 1968

3,377,861
ELECTRONIC LIQUID MEASURING SYSTEM
Sherwood Thaler, Spring Valley, and Alfred D. Gronner, White Plains, N.Y., assignors to Simmonds Precision Products, Inc., Tarrytown, N.Y., a corporation of New York
Filed May 6, 1965, Ser. No. 453,716
3 Claims. (Cl. 73—304)

The present invention relates to fuel gauging systems and, more particularly, to a capacitance gauging system responding to cryogenic fluids at all levels and all attitudes.

Accordingly, it is the object of this invention to provide capacitive gauging which is accurate, safe and simple in instrumentation and which is reliable in operation throughout the full region of flight in the earth's gravitational field and in zero gravitational conditions.

It is another object of this invention to provide a capacitive gauging system consisting entirely of surface measurements in which capacitive sensors extend along the inner walls of a fuel tank.

It is another object of this invention to provide a capacitive gauging system which responds to the liquid in the tank rather than to the volume of gas, thus leading to greatly improved accuracies at low levels where accuracy is most often needed.

It is yet another object of this invention to provide a capacitance gauging system to achieve mass readings of the fuel being measured.

It is still yet another object to provide a capacitance gauging system for a fuel tank in which the effects of "fringing" are substantially reduced.

According to one embodiment utilizing the principles of the present invention, there is provided a fuel tank of substantially square configuration having a plurality of capacitive strip sensors arranged in parallel relation on the inside surface of the tank. The capacitive sensors in each wall of a parallel pair of walls are connected together and the capacitance across these walls is measured, meanwhile each of the strip sensors on one of the remaining walls of the tank is connected to its corresponding strip sensor on the other of the remaining walls of the tank. With this arrangement a linear electric field is established at the end surfaces of the tank and the errors which normally exist due to "fringing" are substantially reduced. It can be shown that if the dielectric material between the walls of the tank is less than 1.5, which is the case for most fuels, a surface capacitive measurement is then capable of ±1.5% accuracy.

Other objects and advantages will become apparent upon a further reading of the following detailed description taken in conjunction with the drawings, in which.

Figure 1:
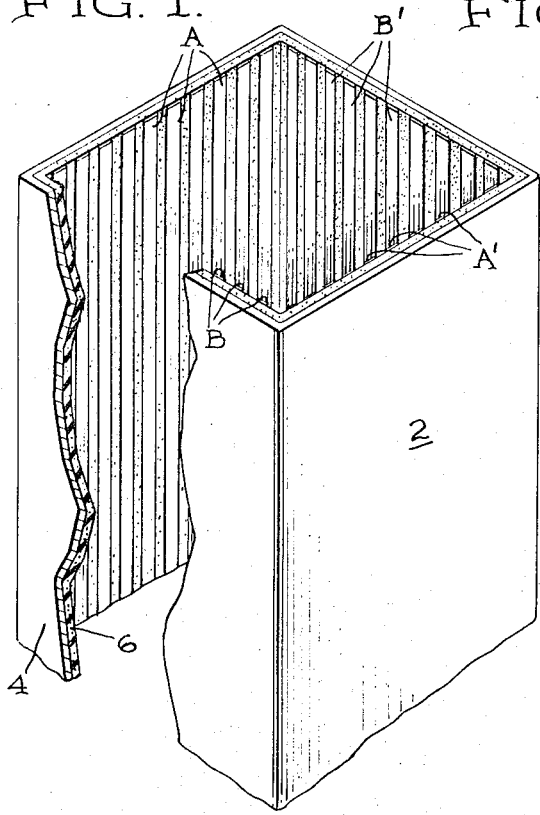
FIG. 1 is a perspective view in cut-away of a fuel tank utilizing the principles of this invention.
Figure 2:
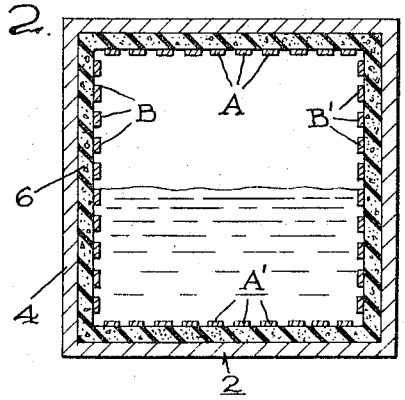
FIG. 2 is a cross-sectional view of the fuel tank according to this invention showing the fuel in one position.
Figure 3:
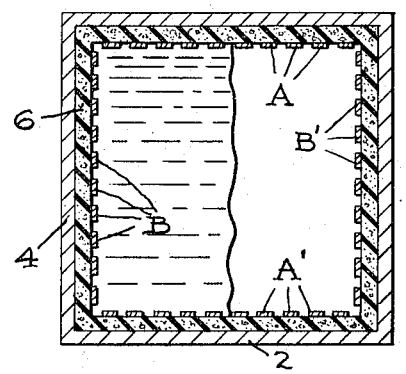
FIG. 3 is a cross-sectional view of the fuel tank according to this invention showing the fuel in another position.
Figure 6:
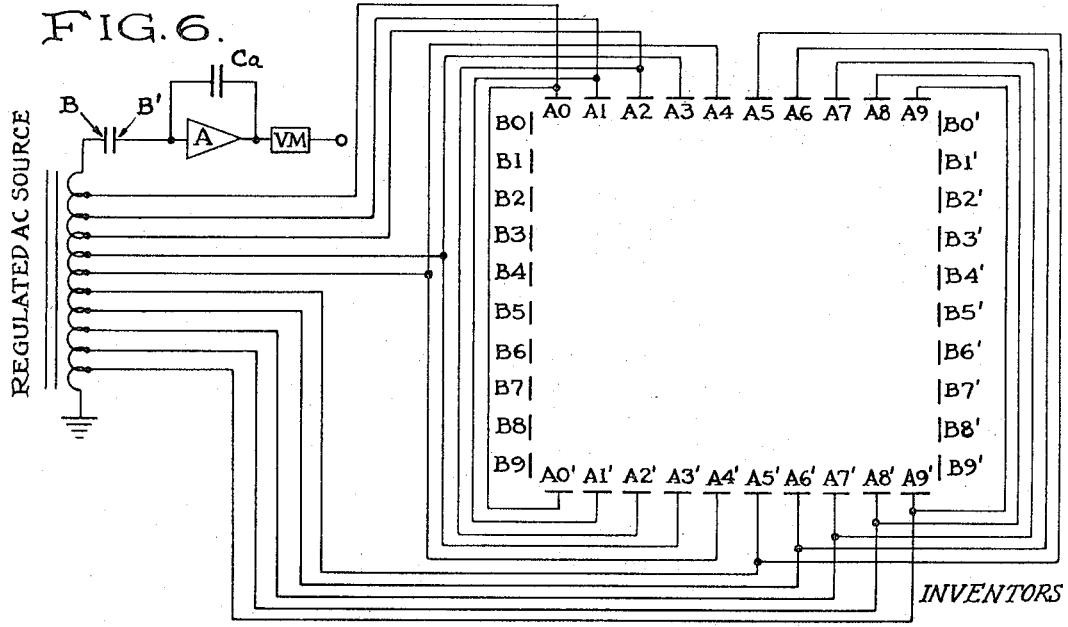
FIG. 6 is a schematic diagram illustrating the circuit used in this invention.

Referring now to FIG. 1 there is shown a fuel tank 2 of square configuration. The tank 2 has an outside layer of conductive metal 4 and an inside layer of foam rubber 6. A series of parallel capacitor electrode strips A, A', B, B' are secured to the foam rubber in the manner shown. FIGURE 6 shows how the strips are connected for a capacitance reading across strips B, B'. This is accomplished by connecting all the B strips 0–9 together and all the B' strips 0–9 together. The A, A' strips are then connected as will be explained later. It may be shown that for a given quantity of liquid X the maximum capacitance will result when the liquid is located in a vertical slab as shown in FIG. 3. It may also be shown that the minimal capacitance will result when the liquid is oriented as a horizontal slab as shown in FIG. 2. All of the distributions will fall at or within these two limits. Since the distribution of propellants or liquid may be such as to produce any reading between these two limits, their difference must be considered to be a region of ambiguity and, therefore, of error.

The capacitance between strips B and B' may be shown to have the following relationship.

$$C_{BB'} = C_a[(K-1)+1]$$

$$C_{BB'H} = m\frac{KC_a}{X(1-K)+K}$$

$C_{BB'}$ = capacitance between strips B and B' with the liquid oriented as shown in FIG. 3
$C_{BB'H}$ = capacitance between strips B and B' with the liquid oriented as shown in FIG. 2
$K$ = dielectric constant of the liquid
$X$ = volume filled with liquid ($0 \times 1$)
$C_a$ = capacitance of strip in a vacuum Now the error (E) will be:

$$E = C_{BB'V} - C_{BB'H}$$

$$E = \frac{KC_a}{(1-K)+K} - C[(K-1)+1]$$

After algebraic manipulation this equation is simplified to:

$$E = \frac{C_a X(1-X)(K-1)^2}{(1-K)+K}$$

However, the full scale change in capacitation for $X=1.0$ is $$C_a(K-1)$$

$\theta$, therefore, is defined as the percent of full scale error, and so:

$$\theta = \frac{100E}{(K-1)C_a}$$

$$\theta = \frac{100X(1-K)(K-1)}{X(1-K)K}$$

Now let $$\partial\theta = \theta =$$

$$\frac{[(1-K)+K][K-1][1-2X]-[1-K][K-1](X)(1-X)}{[X(1-K)+K]^2}$$

After further algebraic manipulation and simplification it then appears that the maximum ($X_m$) occurs for:

$$X_m = \frac{K-\sqrt{K}}{-1}$$

Figure 4:
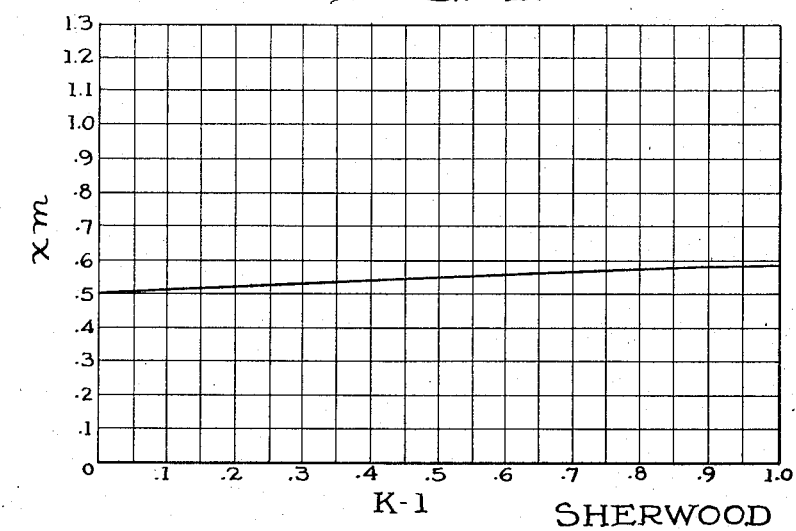
FIG. 4 is a graphical representation illustrating the maximum value for the liquid volume in the tank under maximum adverse conditions.

As a simplifying approximation, the binominal expansion of the form $$\sqrt{1+X} = 1+\frac{X}{2}$$

is used to show that $X \approx 0.5$ as shown in FIG. 4.

Since we are only concerned with values of K less than 1.5 (the values for most fuels) or $X<0.5$, the approximation is valid for values of $K-1$ less than 0.5. The graphical solution of the equation for $X_m$ is shown in FIG. 4.

Having established the area about $X=0.5$ as being the worst case, the error is now evaluated $$\theta = \frac{100(X)(1-N)(K-1)}{K(1-K)+K} \approx \frac{25(K-1)}{0.5(K+1)} = \frac{50K-1}{K+1}$$

Since this error band is unidirectional, a factor of 2 improvement may be assumed by having a bidirectional, thus $$\theta_m = -25\frac{K-1}{K+1} \text{ for } X=0.5$$

Figure 5:
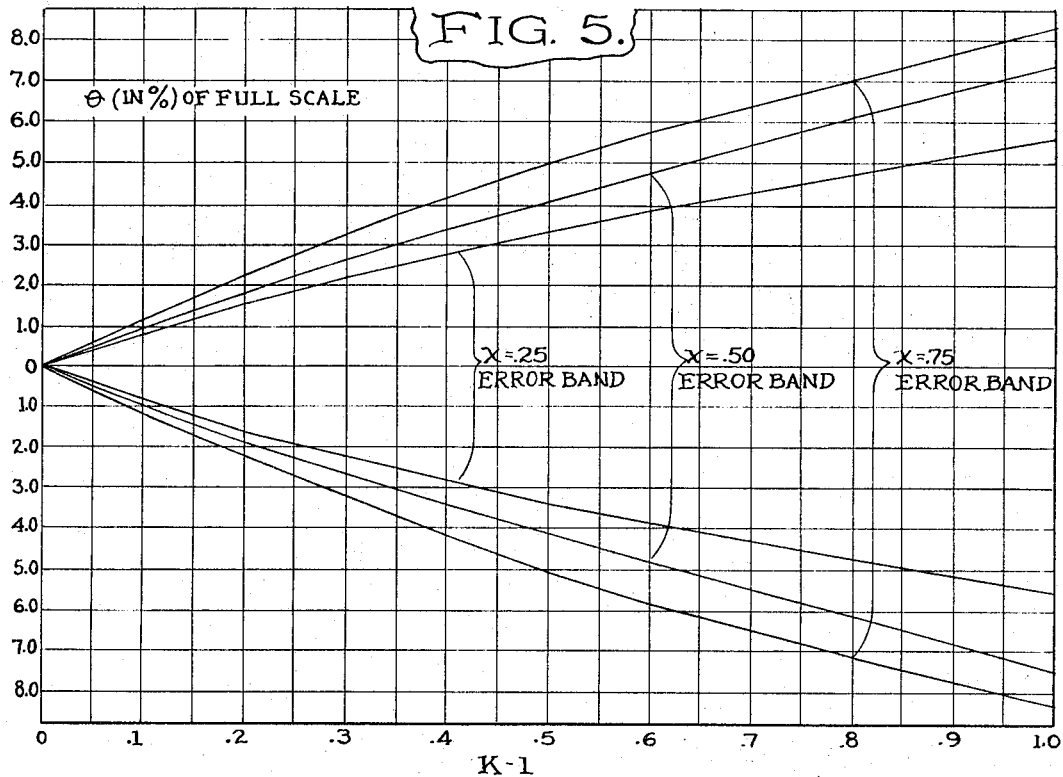
FIG. 5 is a graphical representation illustrating the maximum error found for maximum adverse conditions.

Since the maximum error band shown in FIG. 5 represents that arising from a worst case distribution of propellant about the most critical point, it should be apparent that statistical theory weighs heavily against this error being achieved in a working system. For comparative purposes, the 25% and 75% levels are also included in FIG. 5.

For a zero gravitational field environment, the Clausius-Massotti relation allows for a precise correlationship between dielectric constant K and density D of the propellant. This relationship is given by the equation:

$$PD = \frac{K-1}{K+2}$$

where:

$K$=dielectric constant
$D$=density
$P$=specific polarization

For cyrogenics the C-M law and experimental data show a near linear relationship between K and D which is more specifically described in an application filed by Irving H. Cohn on Mar. 12, 1965, Ser. No. 439,253, having the same assignee as this application. Thus, a capacitance gauging system requires little or no compensating elements in achieving a propellant mass reading. Also, the surface capacitance system utilizing the principles of this invention respond to the liquid in the tank rather than to the volume of gas. This leads to greatly improved accuracies at low levels.

In FIG. 6 a regulated AC source supplies the electrodes A, A' current and the electrodes B, B' current as shown. In order to reduce fringing effects the A strips 0–9 are connected to their corresponding A' strips 0–9, as shown in FIG. 6. A linear field is therefore established at the end surfaces of the tank and the errors which formerly existed due to fringing are substantially reduced. At this point the capacitance across B, B' is measured and the resultant signal is fed through an appropriate amplifier A and compared with a reference capacitance value $C_a$. A suitable volume-mass, VM indicator is then energized by the resultant signal from the amplifier circuit.

Although only one embodiment of the invention has been depicted and described, it will be apparent that this embodiment is illustrative in nature and that a number of modifications in the apparatus and variations in its end use may be effected without departing from the spirit or scope of the invention as defined in the appended claims.

That which is claimed is:

1. In a capacitance gauging system for indicating the mass of fluid in a square shaped container comprising a plurality of parallel spaced apart capacitance strip electrodes extending along the inside surface of the walls of said container, means supplying an alternating current to said electrodes, each of said electrode strips being electrically connected together on each wall in one pair of opposing walls, each electrode strip in one of the remaining walls of said container being electrically interconnected with its corresponding electrode strip on the other of said remaining walls in said container and indicating means connected to said alternating current source for indicating the capacitance across said pair of opposing walls of said container.

2. In a capacitance gauging system for indicating the mass of fluid in a square shaped container comprising capacitance electrode means extending along the inside surface of a pair of opposing walls of said container, a plurality of parallel spaced apart electrode means extending along the inside surface of the remaining walls of said container, means supplying an alternating current to said electrode means, each of said electrode means on one of said remaining walls being electrically interconnected to its corresponding electrode means on the other of said remaining walls and indicating means connected to said alternating current source for indicating the capacitance across said pair of opposing walls of said container.

3. In a capacitance gauging system for indicating the mass of fluid in a rectangular shaped container comprising a capacitance electrode means extending along the inside surface of a pair of opposing walls of said container, means supplying an alternating current to said electrode means and indicating means connected to said alternating current source for indicating the capacitance across said opposing walls of said container.

References Cited

UNITED STATES PATENTS

| 2,357,023 | 8/1944 | Reid et al. | 73—304 |
| 2,911,576 | 11/1959 | De Giers | 73—304 X |
| 3,180,146 | 4/1965 | Hossack | 73—304 X |

FOREIGN PATENTS

| 795,189 | 5/1958 | Great Britain. |

DAVID SCHONBERG, *Primary Examiner.*

S. CLEMENT SWISHER, *Assistant Examiner.*